Figure 1:
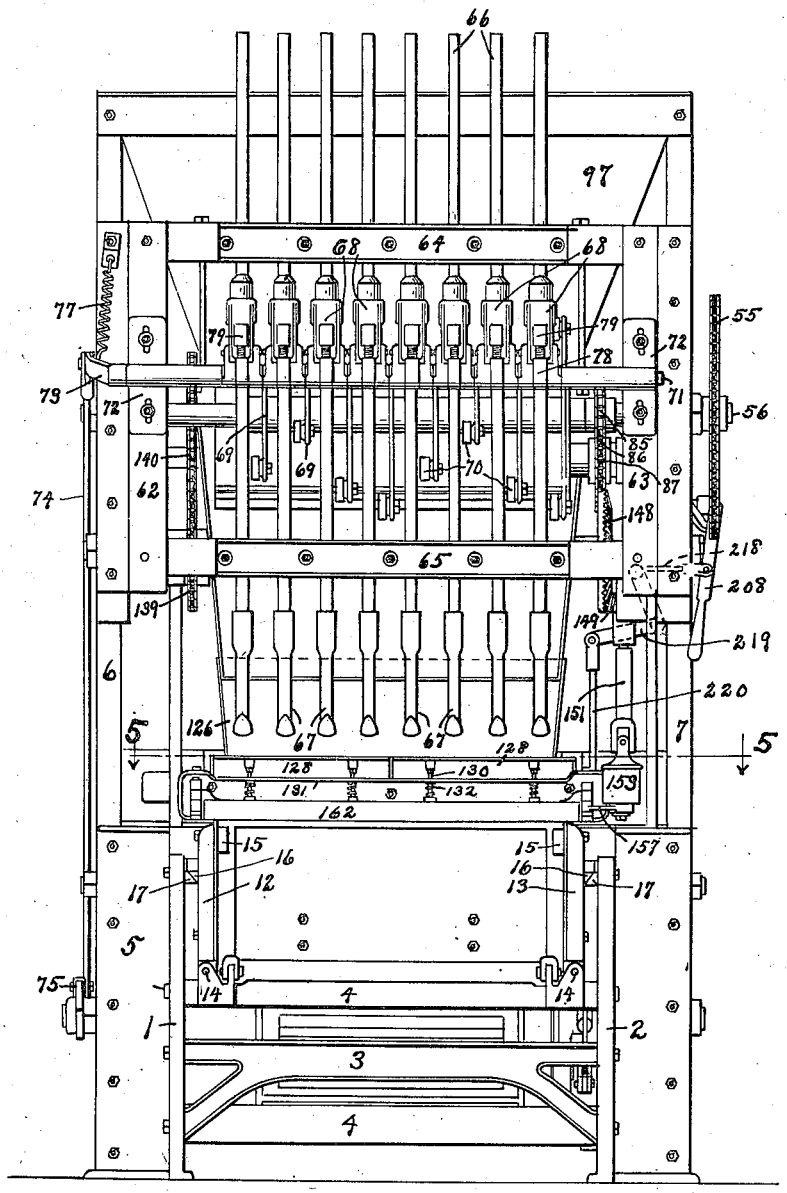

Nov. 27, 1923.

C. O. BRANDELL

BLOCK MACHINE

Filed March 12, 1920 17 Sheets-Sheet 1

1,475,168

INVENTOR
Claus O. Brandell.
BY
Pagelsen and Spencer
ATTORNEYS

Nov. 27, 1923
C. O. BRANDELL
BLOCK MACHINE
Filed March 12, 1920 17 Sheets-Sheet 4
1,475,168
Fig-4-
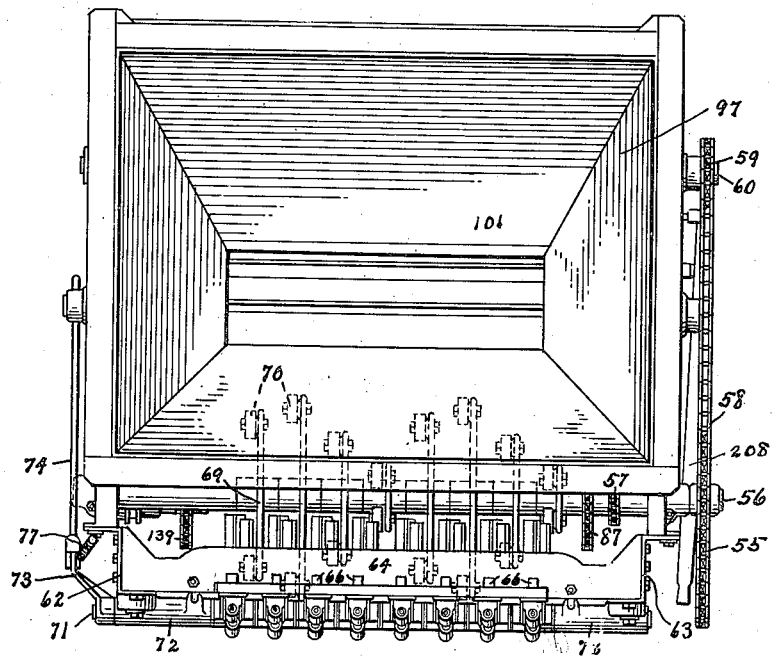
Fig-5-
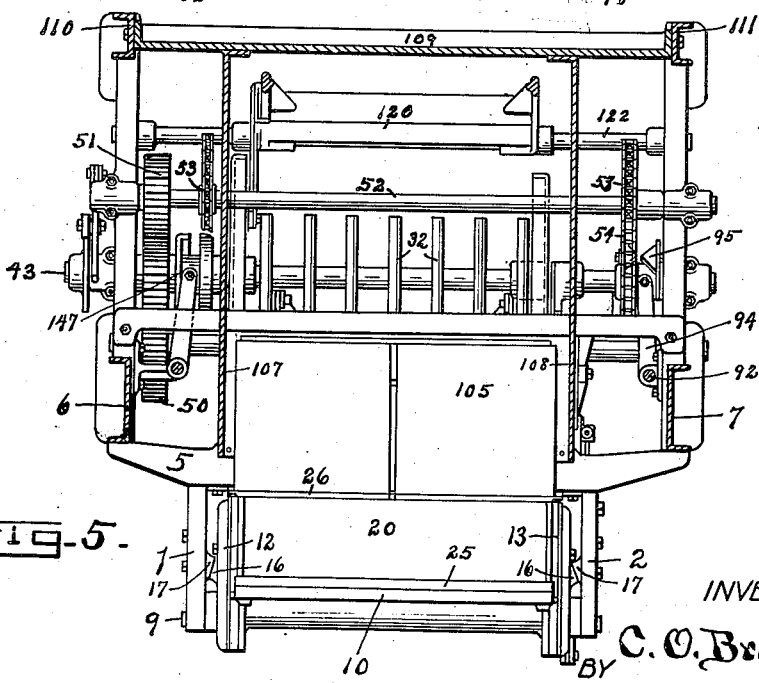
INVENTOR
C. O. Brandell
BY
Pagelsen and Spencer
ATTORNEYS Nov. 27, 1923

C. O. BRANDELL

BLOCK MACHINE

Filed March 12, 1920    17 Sheets-Sheet 5

1,475,168

INVENTOR
Claus O. Brandell
BY
Pagelsen and Spencer
ATTORNEYS

Nov. 27, 1923.                                      1,475,168
C. O. BRANDELL
BLOCK MACHINE
Filed March 12, 1920       17 Sheets-Sheet 6
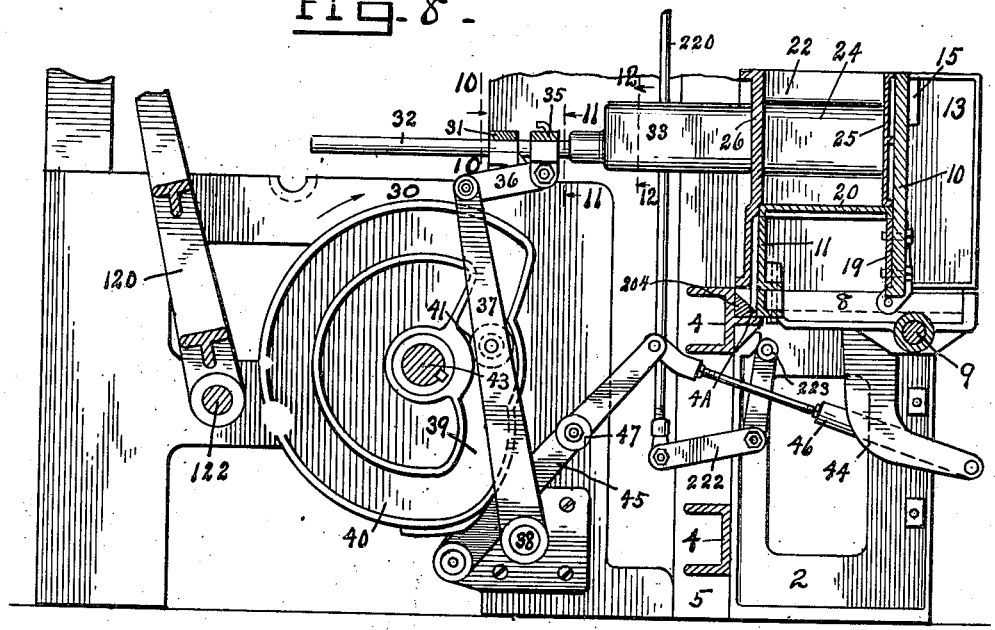
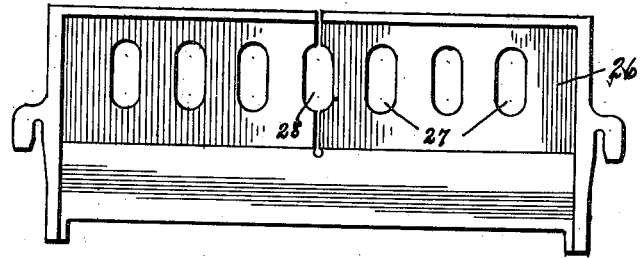
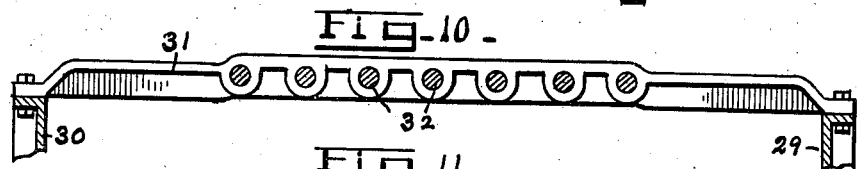
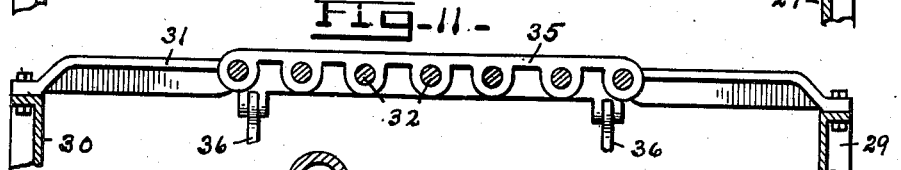
INVENTOR
Claws O. Brandell
BY
Pagelsen and Spencer
ATTORNEYS Nov. 27, 1923
C. O. BRANDELL
BLOCK MACHINE
Filed March 12, 1920 17 Sheets-Sheet 7
1,475,168
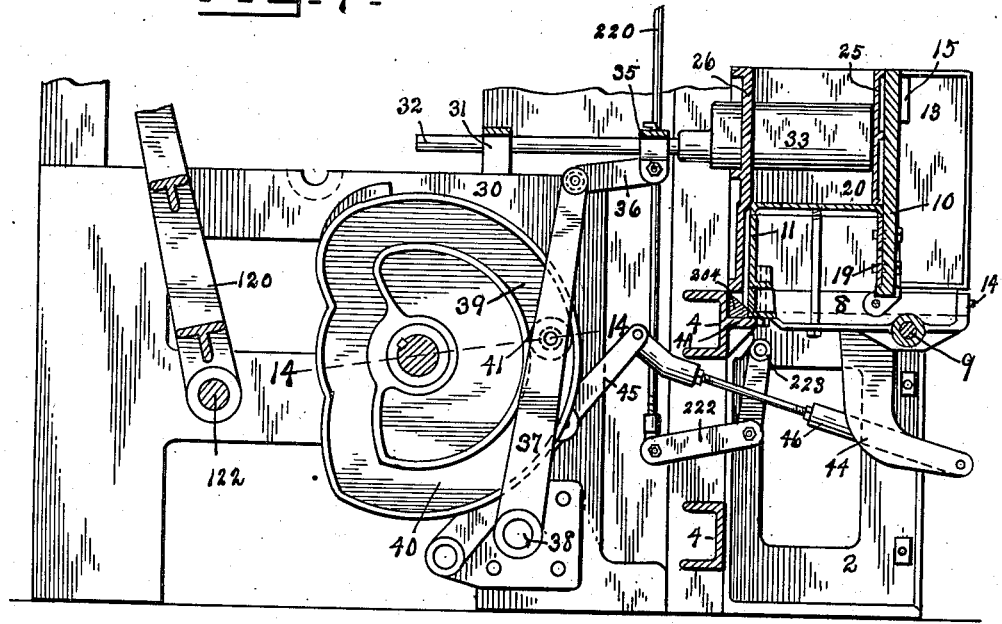
Fig.-9-
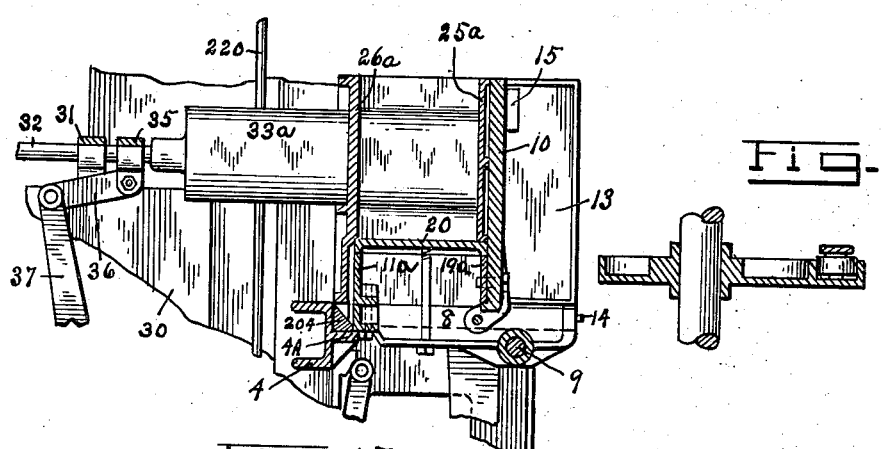
Fig.-14-
Fig.-15-
INVENTOR
Claus O. Brandell
BY
Pagelsen and Spencer
ATTORNEYS Nov. 27, 1923.

C. O. BRANDELL
BLOCK MACHINE
Filed March 12, 1920    17 Sheets-Sheet 8

1,475,168

INVENTOR
Claus O. Brandell
BY
Pagelsen and Spencer
ATTORNEYS

Nov. 27, 1923. 1,475,168
C. O. BRANDELL
BLOCK MACHINE
Filed March 12, 1920  17 Sheets-Sheet 9
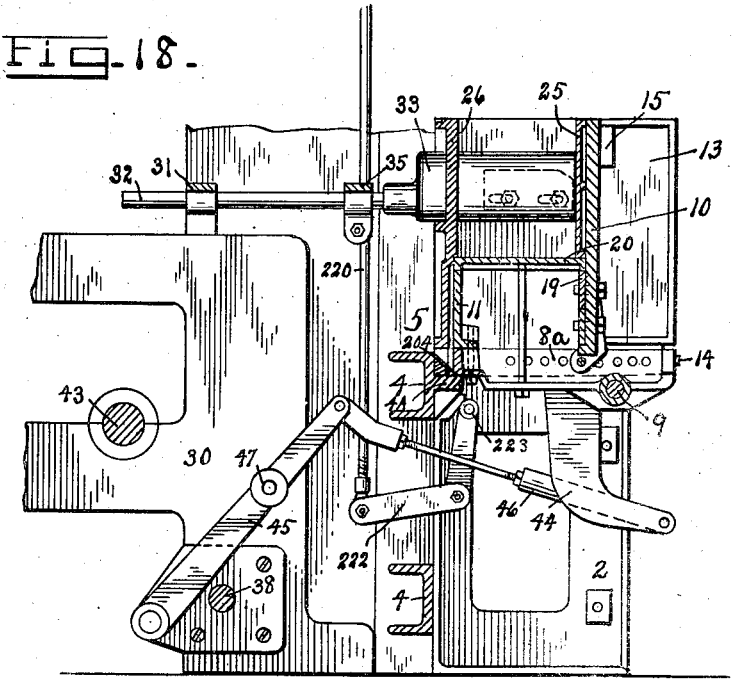
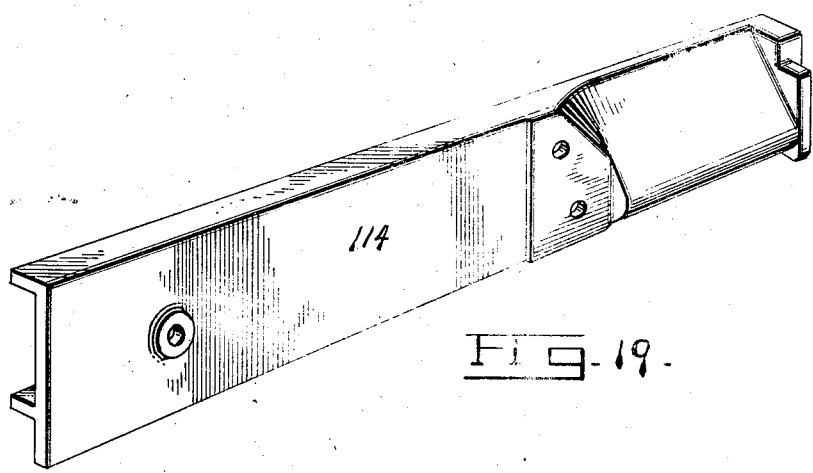
INVENTOR.
Claus O. Brandell
BY
Pagelsen and Spencer
ATTORNEYS.

Nov. 27, 1923

C. O. BRANDELL

BLOCK MACHINE

Filed March 12, 1920 — 17 Sheets-Sheet 10

1,475,168

INVENTOR.
Claus O. Brandell
BY
Pagelsen and Spencer
ATTORNEYS.

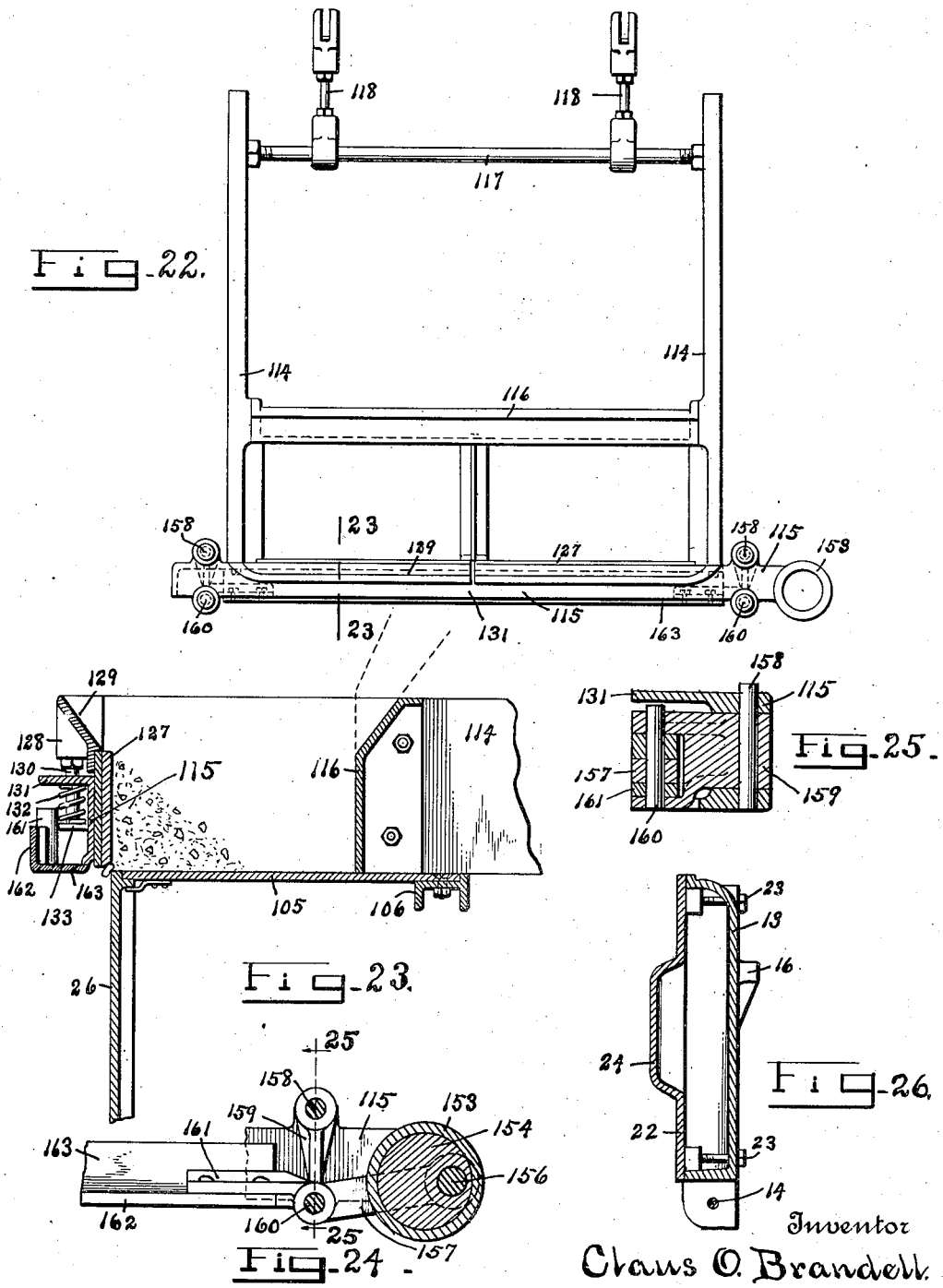

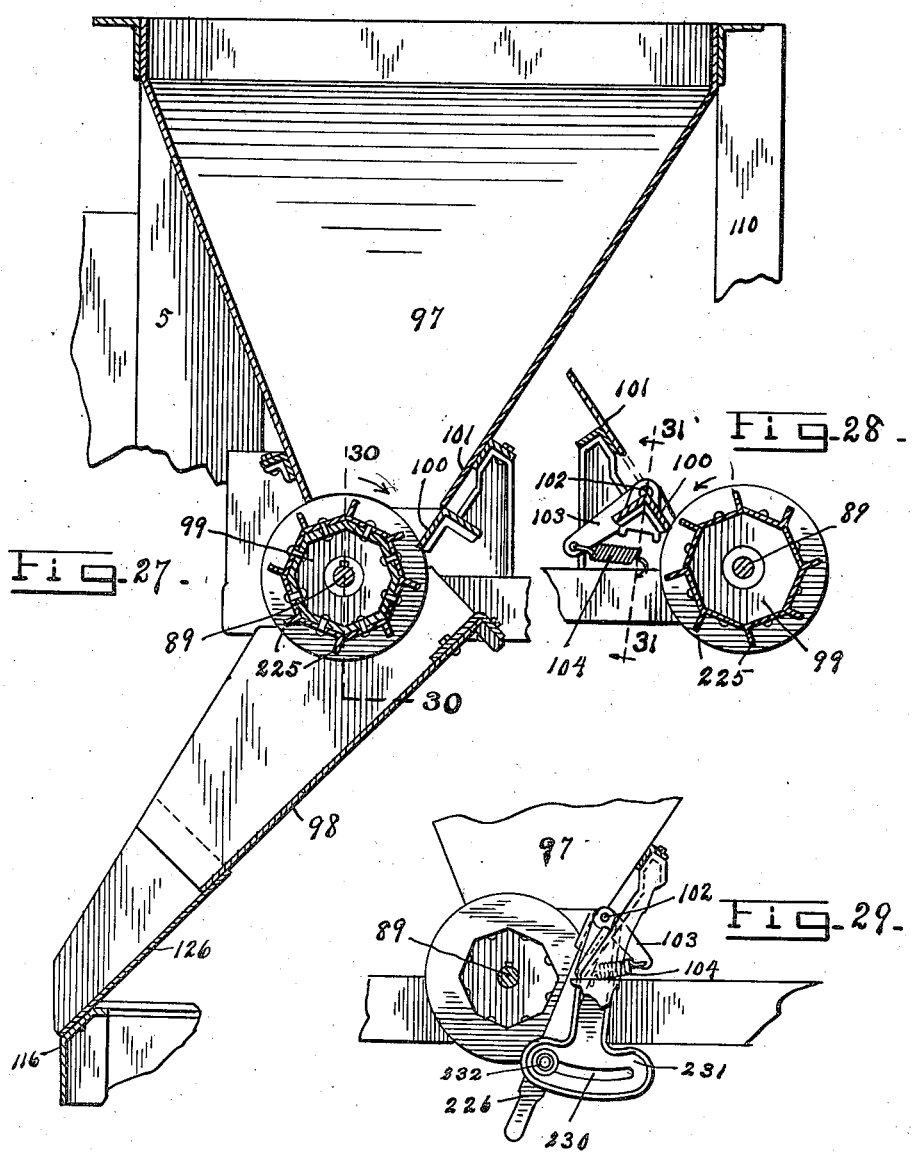

Nov. 27, 1923

C. O. BRANDELL

BLOCK MACHINE

Filed March 12, 1920

1,475,168

17 Sheets-Sheet 13

Inventor
Claus O. Brandell
By Pagelsen and Spencer
Attorneys

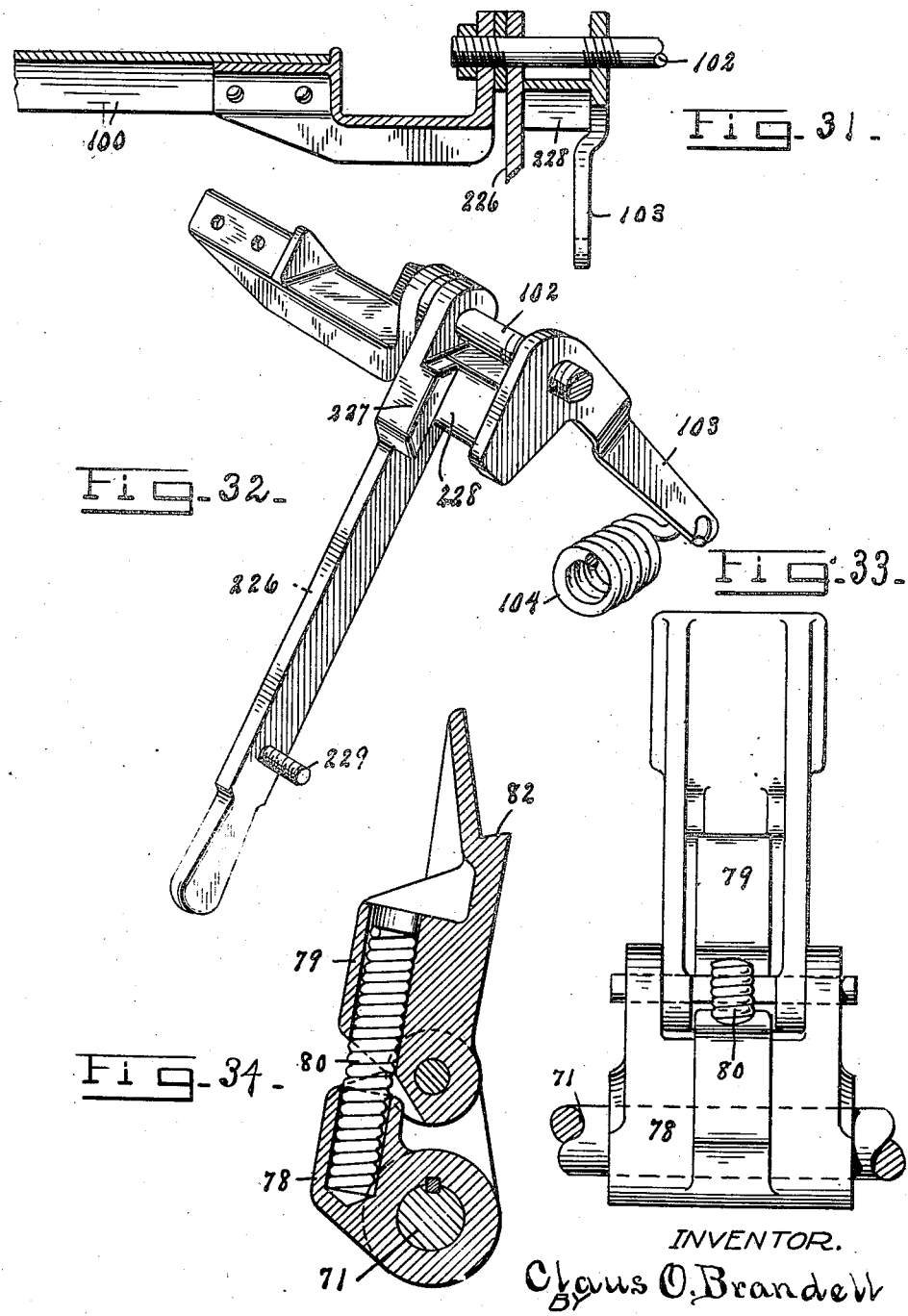

Nov. 27, 1923

C. O. BRANDELL 1,475,168

BLOCK MACHINE

Filed March 12, 1920 17 Sheets-Sheet 15

INVENTOR
Claus O. Brandell
BY
Pagelsen and Spencer
ATTORNEYS

Nov. 27, 1923
C. O. BRANDELL
BLOCK MACHINE
Filed March 12, 1920    17 Sheets-Sheet 16
1,475,168
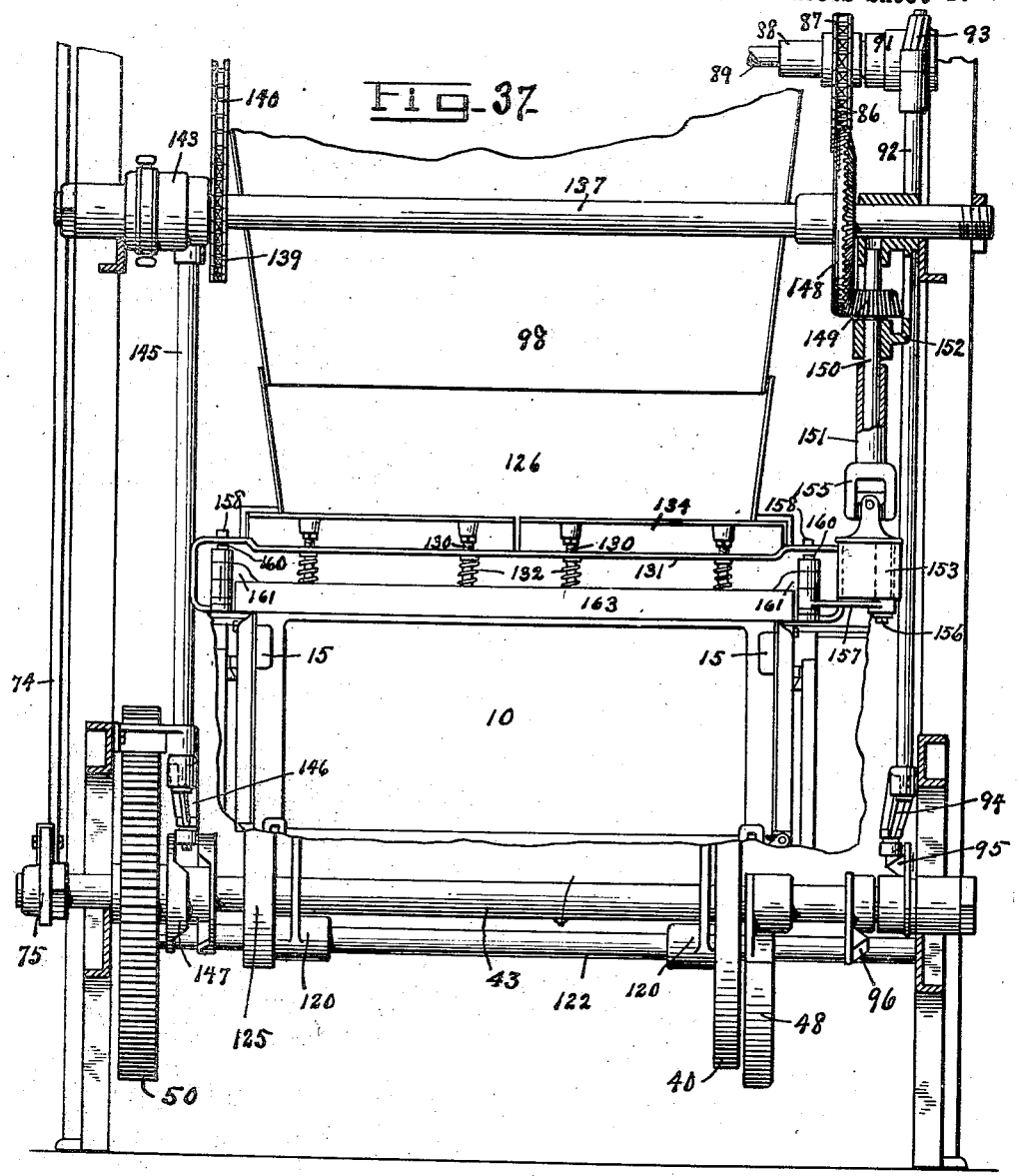
INVENTOR
Claws O. Brandell
BY
Pagelsen and Spencer
ATTORNEYS Nov. 27, 1923
C. O. BRANDELL
BLOCK MACHINE
Filed March 12, 1920   17 Sheets-Sheet 17
1,475,168
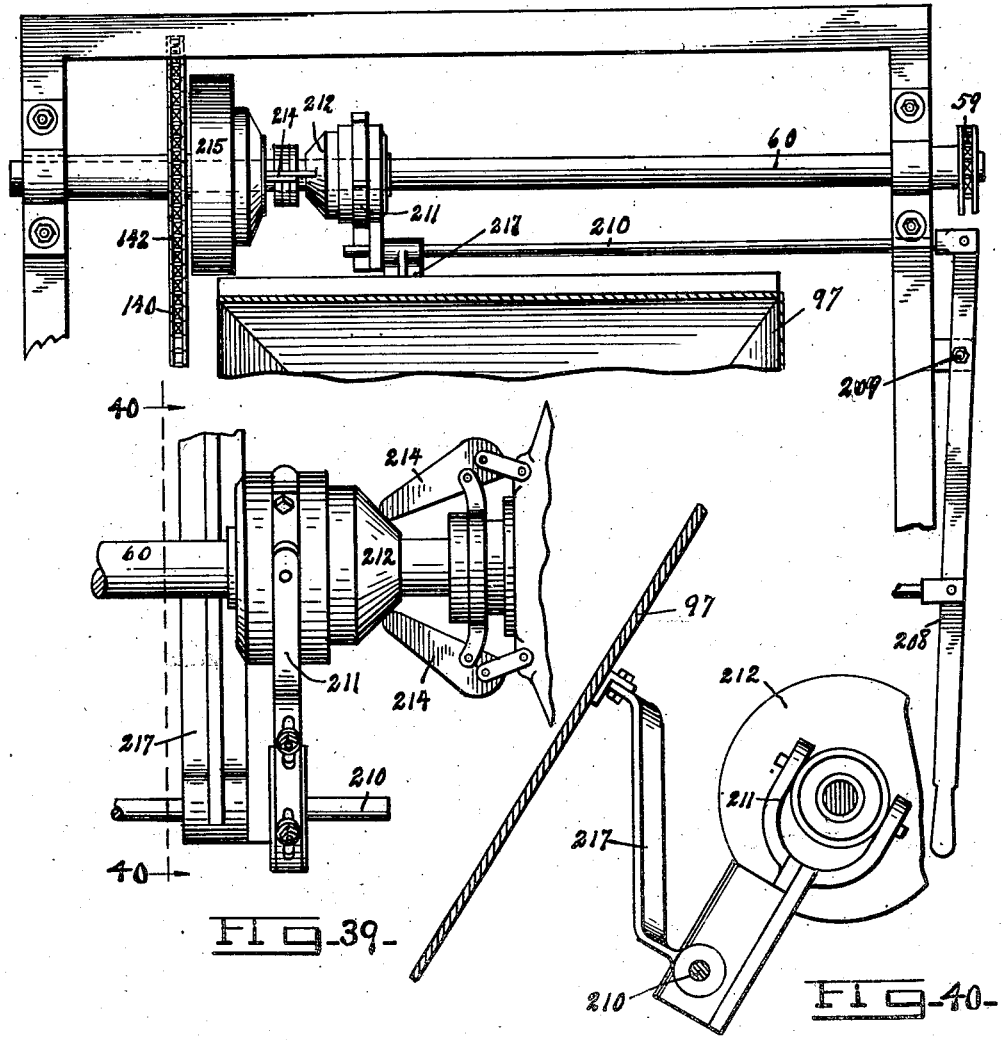
INVENTOR
Claus O. Brandell
BY
Pagelsen and Spencer
ATTORNEYS

Patented Nov. 27, 1923.

1,475,168

UNITED STATES PATENT OFFICE.

CLAUS O. BRANDELL, OF CHICAGO, ILLINOIS.

BLOCK MACHINE.

Application filed March 12, 1920. Serial No. 365,163.

*To all whom it may concern:*

Be it known that I, CLAUS O. BRANDELL, a citizen of the United States, and residing at Chicago, in the county of Cook and State of Illinois, have invented a new and Improved Block Machine, of which the following is a specification.

This invention relates to machines for forming building blocks from plastic materials, preferably of moist concrete and its object is to provide a block machine which shall be automatic in all of its actions, and which will produce a finished building block by a series of instrumentalities and steps which are timed and regulated mechanically.

This invention consists in combination with a "face-down," horizontally-movable-core block mold and a tamping mechanism, of novel means for feeding block material to the mold, novel means for causing the actuation of the tampers after the mold has been partially filled and until the mold is filled, novel means for smoothing the finished block, novel means for opening the mold, and novel driving mechanism for these various parts to cause these various devices to operate in proper order so as to produce a finished block. It also consists in the details of construction illustrated in the accompanying drawings and fully pointed out in the claims.

Figure 2:
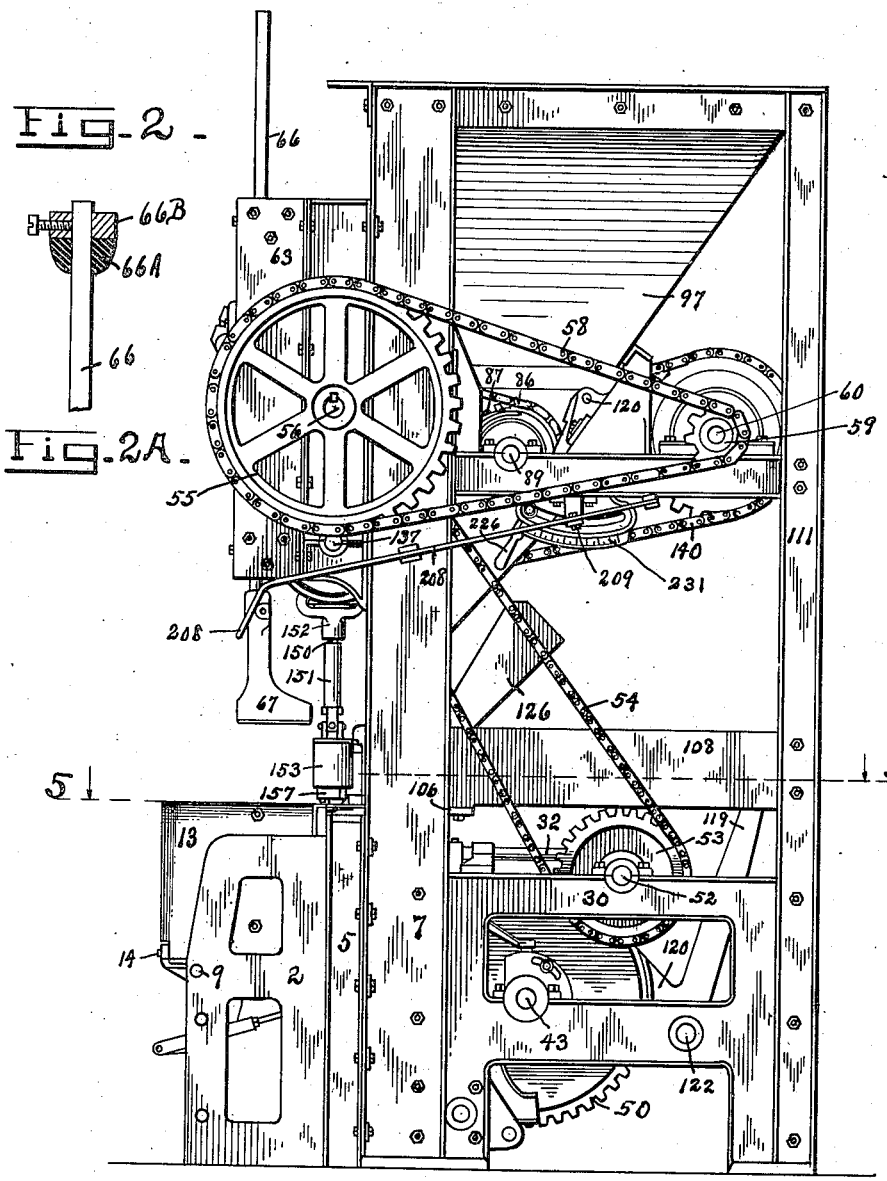
Figure 3:
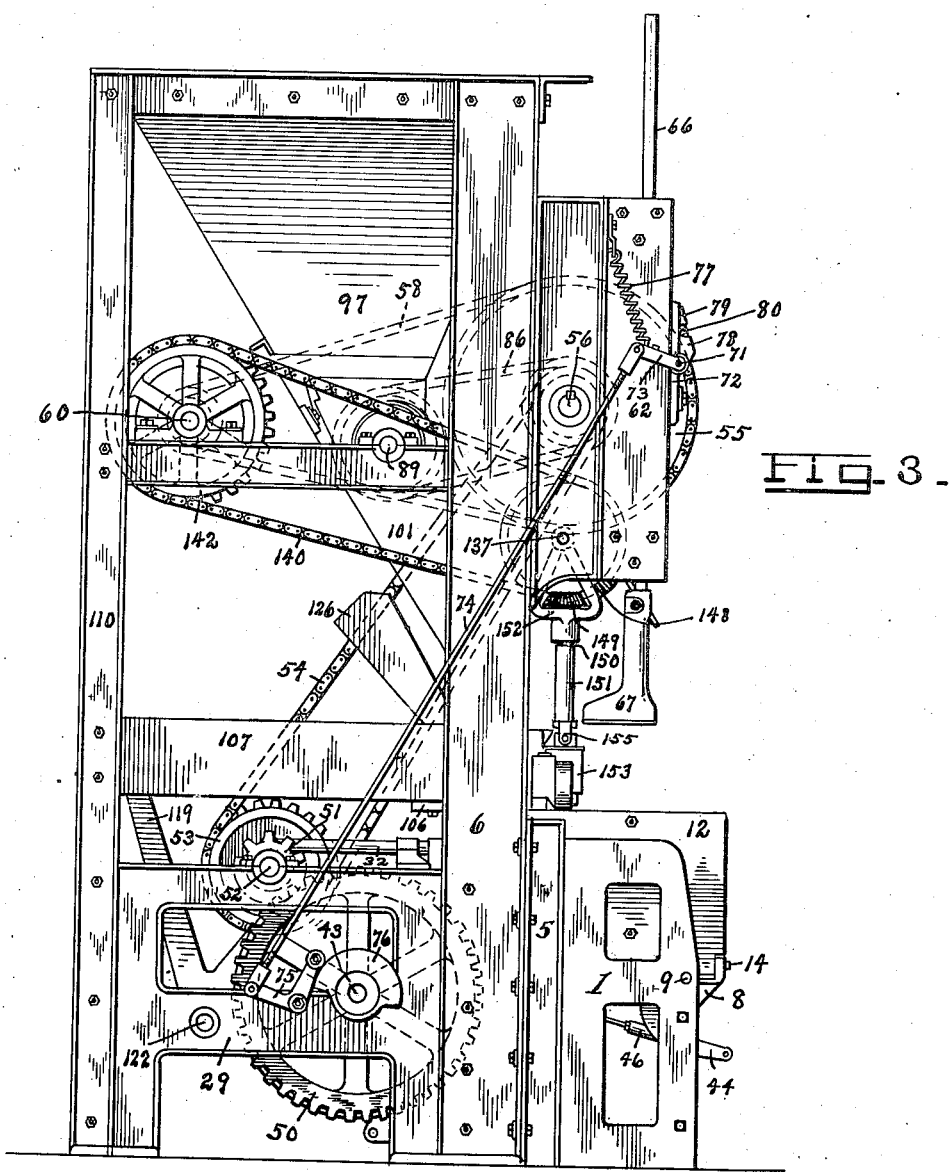
Figure 6:
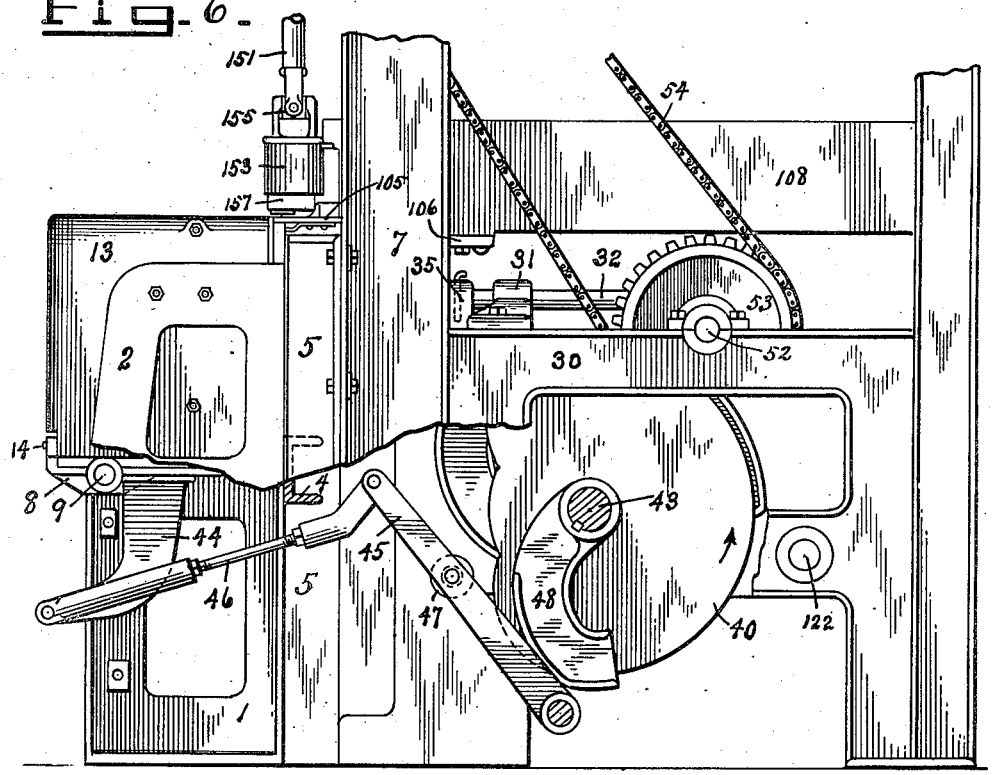
Figure 7:
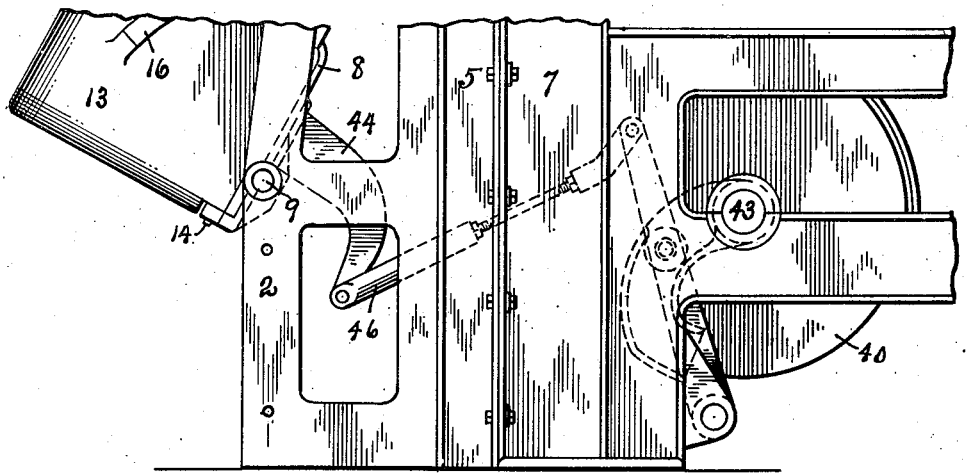
Figure 20:
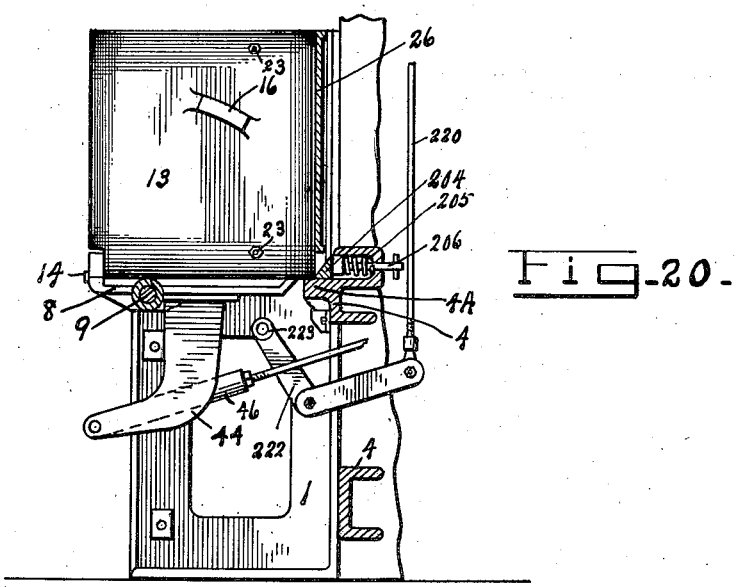
Figure 21:
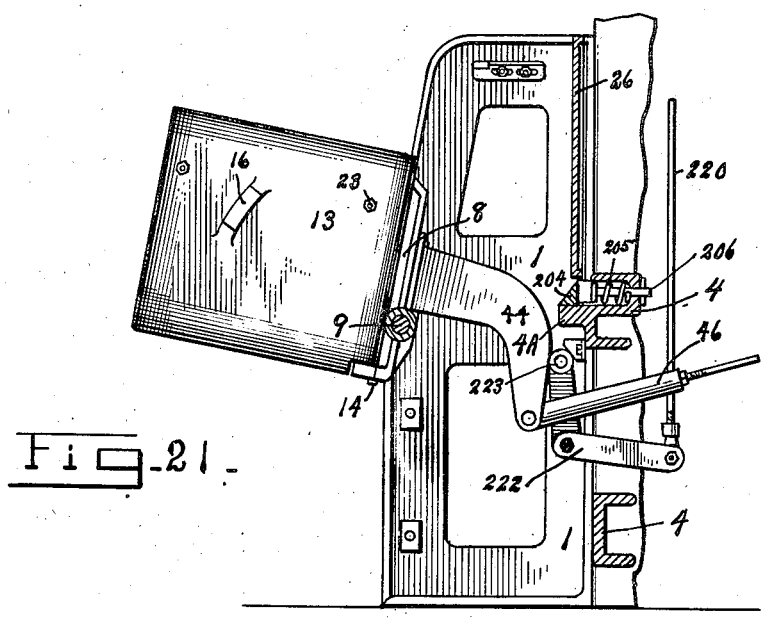
Figure 30A:
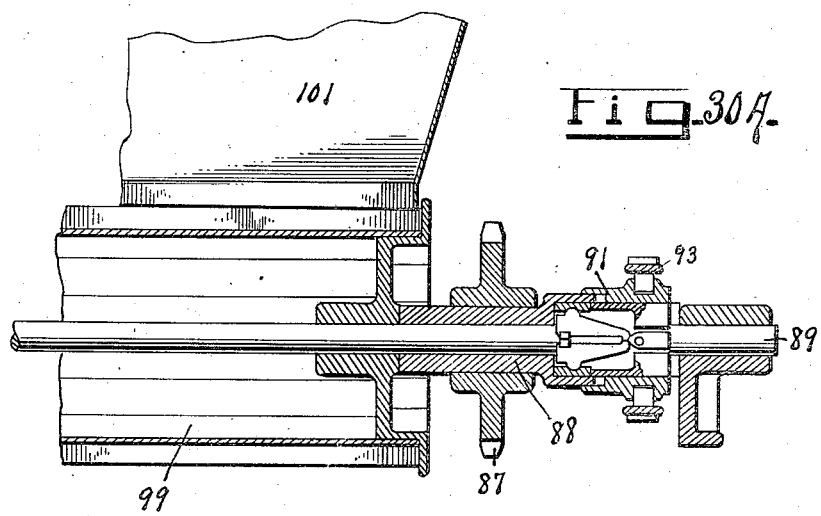
Figure 30:
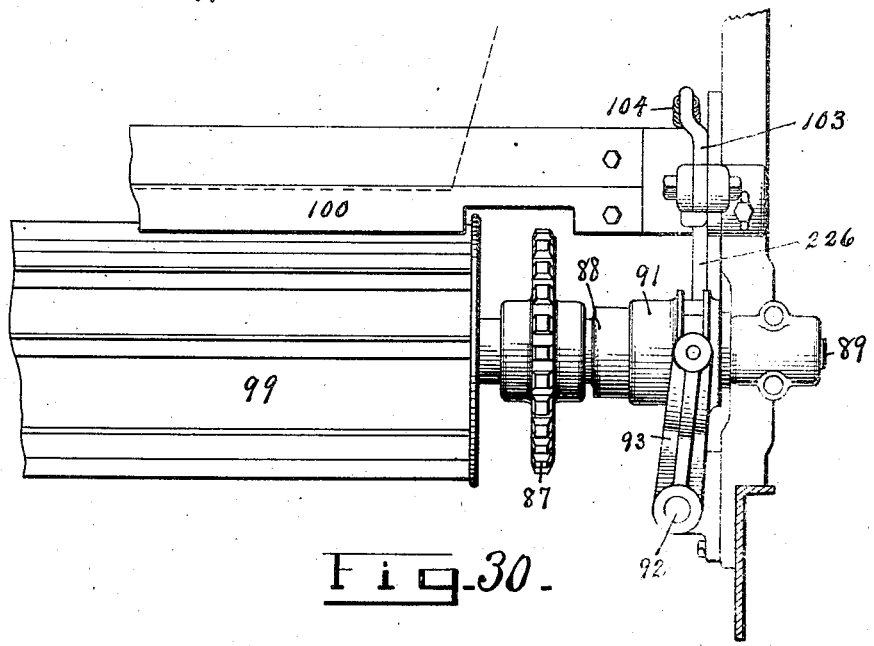
Figures 35, 36:
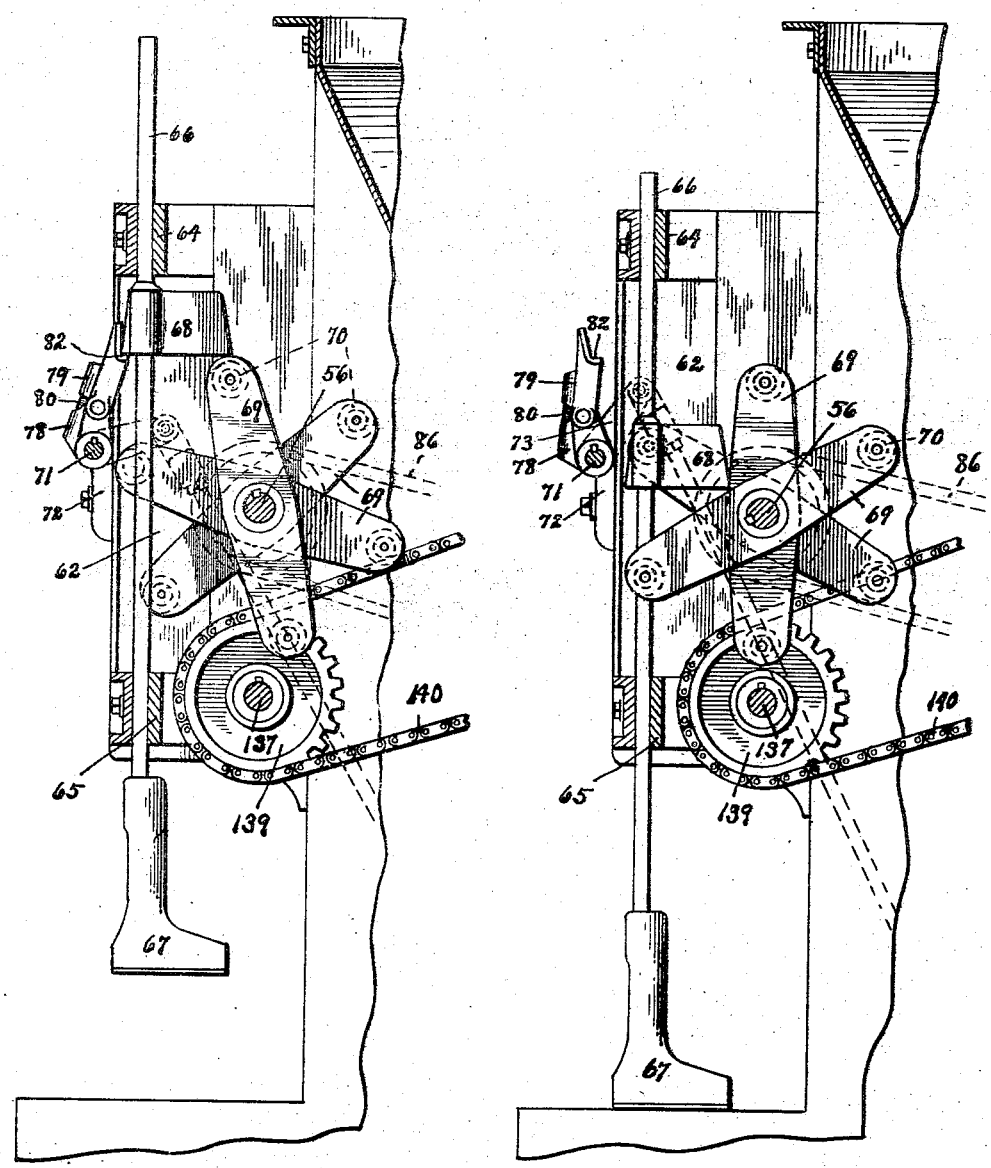

In the drawings, Fig. 1 is a front elevation of this improved block machine. Figs. 2 and 3 are side elevations thereof. Fig. 2^A is a detail of a tamper rod. Fig. 4 is a plan of the machine. Fig. 5 is a section on the lines 5—5 of Figs. 1 and 2. Figs. 6 and 7 are side elevations of the lower part of the machine showing the mold in two different positions. Figs. 8 and 9 are central longitudinal sections of the lower part of the machine showing the core-actuating mechanism in different positions. Figs. 10, 11 and 12 are sections on the lines 10—10, 11—11 and 12—12 of Fig. 8, respectively. Fig. 13 is a detail of a back plate. Fig. 14 is a section on the line 14—14 of Fig. 9. Fig. 15 is a section of the mold similar to Fig. 9 when adjusted for larger blocks. Fig. 16 is a longitudinal section showing the finishing mechanism. Fig. 17 is a section on the line 17—17 of Fig. 16. Fig. 18 is a longitudinal section similar to Fig. 9 illustrating a modified form of mold. Fig. 19 is a perspective of a side plate of the block-finisher frame shown in Fig. 16. Figs. 20 and 21 are sections longitudinally of the machines alongside the mold, showing it in two positions. Fig. 22 is a plan of the finisher and Fig. 23 is a section on the line 23—23 of Fig. 22 on a larger scale. Fig. 24 is a detail showing the mechanism for operating the finisher. Fig. 25 is a section on the line 25—25 of Fig. 24. Fig. 26 is a central transverse section of a side door of the mold. Fig. 27 is a central section of the hopper longitudinally of the machine. Fig. 28 is a similar section showing the feed controller. Fig. 29 is an end elevation thereof. Fig. 30 is a plan of the feed controller. Fig. 30^a is a section on the line 30—30 of Fig. 27. Figs. 31 and 32 are a section and an elevation, respectively, of the feed controlling lever, the former on the line 31—31 of Fig. 28. Fig. 33 is a front elevation and Fig. 34 is a longitudinal section of a stop for a tamper. Figs. 35 and 36 are elevations of the tamping mechanism. Fig. 37 is a front elevation of the finisher and the driving mechanism therefor. Fig. 38 is a plan of the main countershaft. Fig. 39 is a rear elevation of the clutch mechanism therefor. Fig. 40 is a section on the line 40—40 of Fig. 39.

This block machine is controlled and largely operated by a main shaft which is set in motion after the mold is manually closed, and the main shaft first inserts the cores and moves the auxiliary spout and finisher forward; second, causes the proper amount of block material to be fed from the storage hopper to the mold; third, causes the operation of the tamping mechanism and later on causes this mechanism to stop operating; fourth, causes the operation and passage across the molded block of the finisher; fifth, withdraws the cores; and sixth, opens the mold.

The mold is of the same general type as that shown in the patent to Borst and Groscop, R. I. No. 12,578, dated December 18, 1906, in which the weather or face side of the block is formed against a plate constituting the bottom of the mold and in which the cores that form the air spaces are moved substantially horizontally into the mold through openings in the backplate, and in which the block is discharged by swinging down the front plate to horizontal position and the bottom plate is swung up to vertical position. This discharging occurs during the last sixty degrees of the cycle of the present machine.

When the mold has been closed, a main control lever is swung over by hand, causing the main driving clutch on the countershaft to engage and turn the countershaft, which causes the main shaft and the tamper operating shaft to rotate, and these will continue to turn until the machine stops, the main shaft making just one rotation. The rotation of the main shaft produces the following operations in their order:—

(a) The forward movement of the finisher and of the cores;
(b) The operation of the concrete feeder;
(c) The operation of the tamper;
(d) The stopping of the concrete feeder;
(e) The stopping of the tamper;
(f) The return movement of the finisher and its operation during such return;
(g) The withdrawal of the cores;
(h) The opening of the mold.

The parts of the machine may be termed the mold, the tamping mechanism, the feeding mechanism, the finishing mechanism, and the driving mechanism.

The mold.

The mold comprises two side frames 1 and 2 which are connected by the brace 3 (Fig. 1) and channel bars 4, which are a portion of a connecting frame whose upright portions 5 extend between the side frames 1 and 2 and the legs 6 and 7, of the machine. A bottom frame 8 (Figs. 8 and 9) of the mold is mounted on a shaft 9 which extends between the side frames, and to the bottom frame is secured the front door 10 and a spacing strip or plate 11. A second spacing strip 19 is secured to the front door, and on these spacing strips the bottom plate 20 of the mold is supported. The distance of this bottom plate from the top of the mold determines the width of the block and the thickness of the wall and the configuration of the weather face of the block is determined by the bottom plate. If desired, the bottom frame 8 may be formed with holes so that the front door may be placed at any desired distance from the back plate of the mold, as shown in Fig. 18, so that blocks of any desired depth, within the limits of the machine may be produced. A different bottom plate 20ª will be used for each height of block.

The rear edge of the bottom frame 8 (Figs. 20 and 21) will rest on the ledge 4ª on the cross bar 4, and each time the frame 8 is swung up, this ledge will be cleaned by the triangular bar 204 which is forced forward by the springs 205 on the guide pins 206. But when the frame is swung back to horizontal position, it will engage the upper inclined face of the cleaner bar 204 and force it back, as indicated in Fig. 20. The upper face of the ledge 4ª will therefore always be clean.

The end doors 12 and 13 of the mold are pivoted at their lower edges on bolts 14 mounted in the ends of the bottom frame as indicated in Fig. 1, and these end doors carry lugs 15 which prevent the front door 7 from being moved forwardly or outwardly. Each end door is formed with an inclined lug 16 which engages with a similar lug 17 on the adjacent side frame and thus properly positions the end door. If desired, the doors may be constructed in the manner shown in Fig. 26, where a lining 22 is shown held in position by the bolts 23, the lining having a bulging portion 24 which forms the pocket in the end of the block. The two pockets of adjacent blocks together form an air space. Supported on the face plate 20 against the front door is a pallet 25 on which the molded block will be carried away.

The back plate 26 of the mold is shown in Fig. 13 and has openings 27 for the cores 33, and ears whereby it may be secured to the frame of the machine. If desired, an opening 28 may have vertical extensions to receive a combined core and dividing plate so that two short blocks may be formed at one time. Extending across the machine and supported by the frame members 29 and 30 is a core-rod guide 31, shown in Figs. 10 and 11, in which the core-rods 32 are slidable. The cores 33 are slidable in the openings 27 and are supported by the back plate. The core-rods are all connected to the yoke 35 to which links 36 connect, and these links also connect to the upper ends of the levers 37 pivoted on the shaft 38 which is journaled in the frame members 29 and 30. Cams 40 on the main shaft have grooves 39 to receive the rollers 41 on these levers 37, and these cams are so shaped that the cores will extend into the mold nearly two thirds of the cycle of the machine. These cams are secured to the main shaft 43 in any desired manner. The cores may be of different sizes, that shown in Fig. 9 being adapted for narrow blocks while the core 33ª shown in Fig. 14 is adapted for wider blocks. The spacing strips 11ª and 19ª are narrower than the corresponding strips 11 and 19 in Fig. 9. A different pallet 25ª will be used for each width of blocks.

As stated above, the block mold is opened at the end of the cycle of the machine and this is done by means of the mechanism shown in Figs. 6 and 7. An arm 44 is connected to the bottom frame 8 of the mold and connects at its outer end to a lever 45 by means of an adjustable link 46. A roller 47 on this lever 45 is engaged by the cam 48 just before the end of each cycle and the action of the cam is to swing the parts from the position shown in Fig. 6 to that shown in Fig. 7 and then disengage this roller. The side doors of the mold may then be swung back and the finished block or blocks carried away on the pallet.

The main shaft 43 of the machine has secured to it a large gear 50 which meshes with a pinion 51 (Fig. 3) on the auxiliary shaft 52. A sprocket wheel 53 on this shaft is driven by a chain 54 which passes around the sprocket wheel 57 on the tamper shaft 56. A large sprocket wheel 55 on this tamper shaft is driven by the chain 58 which passes around the smaller sprocket wheel 59 secured to the main countershaft 60, so that whenever the main countershaft is driven, the main shaft 43 and tamper shaft 56 will also rotate.

*The tamping mechanism.*

Extending across forward from the upper portions of the posts 5 and 6 are brackets 62 and 63 and guide bars 64 and 65 extend across between these brackets. Preferably square tamper rods 66 are slidable in these guide bars and have shoes 67 at their lower ends. Cross heads 68 are secured to the tamper rods. A shaft 56 is journaled in the brackets 62 and 63 and has a sprocket wheel 55 (Fig. 2) on one end and a tamper lifter 69 for each tamper intermediate its ends. Each lifter is preferably formed with two arms carrying rollers 70 which will engage the adjacent cross head 68 and carry it from the position shown in Fig. 36 to that shown in Fig. 35. When the roller 65 moves from under the cross head, the tamper falls.

In order to hold up the tampers to permit the mold to be opened, a shaft 71 is journaled in adjustable bearings 72 mounted on the brackets 62 and 63 and on this shaft is a short crank arm 73 from whose outer end an adjustable link 74 extends to the bell-crank 75 shown in Fig. 3. A cam 76 on the main shaft causes this bell-crank to pull down the link 74 against the force of the spring 77 just after the mold has been filled, and to release the bell-crank just after the cores have been moved forward. It will be noticed that this cam 76 is of such length that the tampers will operate during about one half of the cycle of the machine.

Secured to the shaft 71, as shown in Figs. 34 and 36 are a series of dogs, each formed of the two parts 78 and 79 normally held in alinement by the spring 80. Each part 79 has a shoulder 82 adapted to engage a cross-head 68 as shown in Fig. 35, the pawls being made resilient in order to permit these cross-heads during their upward movements to pass the shoulders 82.

Thus while the tamper shaft may rotate during the entire cycle of the machine, the effective rotations are only about one half of that duration and the tampers are always supported up out of the way while they are not operating. It may be desirable to prevent the shoes 67 from striking against the bottom plate of the mold when the machine is set in motion and no block material is in the hopper. In Fig. 2^A a washer 66^A of rubber or other resilient material is shown backed up by means of an adjustable collar 66^B on the tamper rod 66, and this washer and collar may be so positioned on each tamper rod as to engage the cross-bar 64 and stop the tamper rod before the shoe 67 strikes the bottom plate of the mold.

*The concrete feeder.*

Secured to the shaft 56 is a sprocket wheel 85 which drives the chain 86 that extends around the sprocket wheel 87 on the sleeve 88 which normally rotates freely on the feeder shaft 89. See Figs. 1, 2 and 37. A clutch 91 of any desired character connects the sleeve to the shaft and is operated by the arms 93 whenever the vertical shaft 92 is turned by means of the arm 94 at its lower end which arm is engaged by the parts 95 and 96 of a two-part cam shown in Fig. 37. The distance between the parts 95 and 96 determines the length of time the block material is fed down to the mold.

The material hopper 97 is mounted on the general frame of the machine and a main chute or spout 98 extends below the shaft 89 and the feed-drum 99 thereon. An angle bar 100 is pivotally mounted between the rear side 101 of this hopper and the feed drum and is secured at its right end to a short shaft 102. See Figs. 31 and 32. An arm 103 on this shaft is normally held forward by a very stiff spring 104 so that the lower edge of this angle bar will extend nearly to the angle bars 225 on the feed drum.

To determine the minimum opening between the bar 100 and the feed drum, a feed-control lever 226 is pivotally mounted on the short shaft 102 and has a lug 227 normally engaged by the lug 228 on the arm 103. A bolt 229 on this feed-control lever extends through the slot 230 in the stationary plate 231 and a nut 232 may secure this feed-control lever in any desired position, the spring 104 normally causing these parts to act together. But should a larger fragment of stone or other hard material attempt to pass between the angle bar 100 and the feed drum, the spring 104 will yield and permit the bar to swing sufficiently to prevent breakage.

It will be noticed that the cam 95 acts just after the cores have been inserted and the clutch 91 remains in engagement for a sufficient time to cause the desired amount of block material to be fed down to the mold, and that this feeding stops just before the cam 76 pulls down the rod 74 and swings back the tamper stops to discontinue the tamping. After the tamping has stopped the excess material is scraped from the top of the mold and the upper surface of the block is finished by the mechanism next described.

Scraper and finisher.

As indicated in Figs. 5, 16 and 23, a plate 105 may extend rearwardly from the top edge of the back plate 26 and rest on the cross bar 106. Above this plate are two guides 107 and 108 which are also secured to the cross bar 109, shown in Fig. 16, which extends across between the rear posts 110 and 111. Slidable between the guides is a scraper and finisher frame, shown in Figs. 22 and 23, having sides 114, front 115, and intermediate member 116. A shaft 117 receives the adjustable links 118 which connect to the upper ends of the arms 119 constituting part of a frame 120. This frame is mounted on the shaft 122 and carries a roller 123 which extends into the groove 124 of the cam 125 on the main shaft 43. The finisher frame is held in its forward position nearly one-half of the cycle of the machine.

The auxiliary or lower chute 126 for the block material is secured to the cross member 116 of this frame and fits against the rear of the main chute of the block-material hopper while the feeder is in operation. The frame acts as a funnel for this material and on its return movement, the scraper plate 127 removes the surplus material of the block in the mold. This plate is preferably in two parts so that, when worn, the inner part may be readily renewed. A supporting member 128 having an inclined portion 129 is secured to the upper edge of the scraper plate and has pins 130 extending through the flange 131 of the front 115 of the scraper frame. Springs 132 between this flange 131 and the heads 133 on these pins normally retain the scraper plate in position but permit the plate to rise when the stone or other larger object becomes caught between the lower edge of the scraper plate and the front edge of the supporting plate 105.

Mounted in bearings in the side brackets 62 and 63 is a shaft 137 on which is mounted a sprocket wheel 139 (Fig. 37). A chain 140 connects this wheel to the wheel 142 on the main countershaft 60 and this wheel 139 will therefore rotate during the entire cycle of the machine. A conventional clutch 143 is operated by an arm (not shown) on the upper end of the shaft 145 on whose lower end is an arm 146 engaging a face cam 147 on the main shaft 43 (Fig. 5). The active dwell of this cam is very short and the shaft 137 will turn during the rearward movement of the scraper frame. This clutch 143 operates to connect this sprocket wheel 139 to the shaft 137 whenever the shaft 145 is turned by the cam 147.

This shaft carries a bevel gear 148, which meshes with a bevel pinion 149 on the upper end of a short shaft 150 that is slidable in but rotative with the sleeve 151. A bracket 152 on the shaft 137 supports the shaft 150 and permits it to swing back and forth. A short socket 153 at the right end of the front 115 of the scraper frame (Figs. 22 and 23) receives a cylindrical drum 154 which connects to the sleeve 151 by means of a universal coupling 155. This drum carries an eccentric pin 156 on which a link 157 is mounted. The front 115 has pins 158 at its ends and these carry short links 159 as shown in Fig. 25, which carry pins 160 at their free ends. The link 157 connects to the adjacent pin 160. Hinge members 161 are mounted on these pins and extend toward each other along the upright leg 162 of the angle bar 163 which constitutes the finisher.

During the forward movement of the frame, the scraper and finisher will pass over an empty mold, but the intermediate cross bar 116 (Fig. 23) will scrape all the material on the plate 105 into the mold. After the mold has been filled and tamped, the frame moves back and the scraper plate 127 will carry back with it onto the plate 105 all surplus material. During this movement of the frame, the shaft 137 rotates and causes the sleeve 151 to turn and also causes the finisher bar 163 to reciprocate as it is moved back over the block. As this finisher bar extends down below the bottom of the scraper plate 127, the block material will be finished off and be left in a smooth condition. The finisher stops reciprocating immediately after the frame has reached the rear end of its movement.

Immediately thereafter the cam 48 swings open the mold and the finished block or blocks may be carried away, a new pallet inserted, the mold closed, and the main control lever be swung to the right to cause the machine to go through another cycle.

When the mold has been closed, the forward end of the main control lever 208, which is pivoted at 209, (Fig. 38), will be swung to the right, causing its rear end and the rod 210 connected thereto to move to the left. The fork 211 on this rod carries the cone 212 of a clutch between the levers 214 thereof and connects the main driving pulley 215 to the main countershaft 60 of the machine. The rod 210 may be supported by a bracket 217 mounted on the hopper for the block material.

Connected to this main control lever is a link 218 which also connects to a bell-crank 219, (Fig. 1) the opposite arm of which connects to a vertical rod 220. This rod also connects to the bell-crank 222 (Fig. 20). When the control lever 208 is swung to the right to start the machine, the rod 220 is pulled up and the bell-crank 222 is swung forward to the position shown in Fig. 20. After the mold has been filled and tamped, and the block finished, the cam 48 engages the roller 47 on the lever 45 and causes the mold to turn to discharging position (Fig. 7). This brings the arm 44 (Fig. 21) against the roller 223 at the front end of the bell-crank 222 and causes this bell-crank to pull down the rod 220, swing down the bell-crank 219, pull the forward end of the main control lever to the left and its right end and rod 210 to the right and disengage the main driving clutch and pulley 215 from the main countershaft 60. This stops the machine.

The details of construction and proportions of the parts of this mechanism may be changed without departing from the spirit of my invention as set forth in the following claims.

I claim:—

1. In a block machine, the combination of a mold and a hopper to hold material, a chute leading from the hopper to the mold and formed of an upper stationary part attached to the hopper and a lower movable part, a container for excess material movable forward and back over the mold and to which the lower part of the chute is attached, the front side of the container being spring mounted, and a finisher bar attached to the front side of said container.

2. In a block machine, the combination of a block mold provided with movable cores, tamping mechanism, and means to supply block material to the mold, of co-ordinated driving mechanisms for the various parts comprising manually operable means for connecting the driving mechanisms to a motor, means to move the cores into the mold, means to release the tamping mechanism and to actuate the tampers and dogs independent of the actuating means to restrain the action of the tampers, after which the means for moving the cores withdraws them from the mold, means for causing the mold to discharge the finished block, and means for stopping the machine.

3. In a block machine, the combination with a mold, a hopper for the block material, movable means for supporting a spout beneath the hopper to guide the block material therefrom to the mold and to carry back the spout after the mold is filled, a finishing mechanism comprising a reciprocating bar mounted on the front end of the spout support, and means to actuate the finishing mechanism as the spout is being moved back from over the mold comprising an eccentric at the front end of the spout support and a swinging shaft to actuate the eccentric.

4. In a block machine, the combination of a mold, tamping mechanism, means for feeding block material to the mold, and means to smooth the top of the block in the mold, of driving mechanism for the various parts comprising a main shaft and manually operable means for connecting the main shaft to a motor, a cam on the main shaft to release the tamping mechanism and means to lift the tampers, means to actuate the feeding mechanism and a cam on the main shaft to control such operation, means to move the smoothing mechanism across the mold, means to actuate the smoothing mechanism, and a cam on the main shaft to control the smoothing mechanism, and a cam on the main shaft to turn the mold to discharging position.

5. In a block machine, the combination of a pivoted mold of the face-down, horizontal-core type adapted to be tilted outward to discharge the molded block, an arm connected to the mold to tilt the same to discharging position, a main shaft mounted in the machine and adapted to make one rotation for each cycle of the machine, a tamping mechanism and driving means therefor connected to the main shaft so as to run during the entire cycle of the machine, means to engage the tampers to restrain their operation and a cam on the main shaft to control the restraining means, and cams on the main shaft to operate the cores and the mold tilting arm, said cams being so formed that first the cores will move into the mold, next the tampers will be released and then checked, next the cores will be withdrawn, and lastly the mold will be tilted to discharging position.

6. In a block machine, the combination of a block mold, a tamping mechanism, a hopper for the block material and feeding mechanism therefor comprising a ribbed roller and an adjustable spring-held gate, and driving mechanism adapted to be manually connected to a motor and comprising means for elevating the tampers and permitting them to drop, means to actuate the feeder, and means to discharge the finished block from the machine.

7. In a block machine, the combination of a block mold, a tamping mechanism, a hopper for the block material and feeding mechanism therefor comprising a ribbed roller and an adjustable spring-held gate, and driving mechanism adapted to be manually connected to a motor and comprising means for elevating the tampers and permitting them to drop, means to actuate the feeder, and means to discharge the finished block from the machine, said means comprising an arm and a lever connected to the mold and a rotatable hook shaped cam having a short engaging surface adapted to engage the lever to tilt the mold and then release the lever.

8. In a block machine, the combination with a mold, a hopper for the block material, means for placing a spout beneath the hopper to guide the block material therefrom to the mold and to remove the spout after the mold is filled, means to tamp the material in the mold and actuating mechanism therefor and means to disconnect the actuating mechanism from the tampers so it will stop actuating the tamper before the spout is removed, means adapted to be swung into the paths of the tamping device to hold the same in elevated position, and means to discharge the block.

9. In a block machine, the combination with a mold, a hopper for the block material, movable means for supporting a spout beneath the hopper to guide the block material therefrom to the mold and to carry back the spout after the mold is filled, a finishing mechanism comprising a reciprocating bar mounted on the front end of the spout support, and means to actuate the finishing mechanism as the spout is being moved back from over the mold.

10. In a block machine, the combination with a tiltable mold and side frames on which it is pivotally mounted, a transverse member connecting the side frames, said transverse member having a ledge on which one edge of said mold may rest, a spring held bar normally resting on said ledge and having an inclined front face adapted to be engaged by the rear edge of the mold and pushed back when the mold is closed, and springs to move the bar forwardly across the ledge to clean the ledge when the mold is opened.

11. In a block machine, the combination of a block mold and a hopper to hold block material, a chute leading therefrom to the mold and formed of two parts, an upper part being secured to the hopper, a scraper frame movable forward and back over the mold to which the second part of the chute is attached, a bar mounted at the front of the scraper frame, means to reciprocate the bar to finish the molded block, and means to move the scraper frame.

12. In a block machine, the combination of a block mold and a hopper to hold block material, a chute leading therefrom to the mold and formed of two parts, an upper part being secured to the hopper, a scraper frame movable forward and back over the mold to which the second part of the chute is attached, means to move the scraper frame, a vertical scraper plate at the front end of the scraper frame, and springs for holding the plate in predetermined position relative to the mold.

13. In a block machine, the combination of a block mold and a hopper to hold block material, a chute leading therefrom to the mold and formed of two parts, an upper part being secured to the hopper, a scraper frame movable forward and back over the mold to which the second part of the chute is attached, means to move the scraper frame, a vertical scraper plate at the front end of the scraper frame, springs for holding the scraper plate in predetermined position relative to the mold, and a plate to receive the material taken up by the scraper plate.

14. In a block machine, the combination of a block mold, a hopper to hold the block material, a chute leading therefrom to the mold, a frame movable forward and back across the mold, a scraper plate mounted on said frame and adapted to determine the height of the block, a finisher bar movably mounted at the front end of said frame, and means to move the frame forward and back and means to reciprocate the finisher bar transversely of the machine during the backward movement of said frame.

15. In a block machine, the combination with a mold, a hopper for the block material, movable means for supporting a spout beneath the hopper to guide the block material therefrom to the mold and to carry back the spout after the mold is filled, a finishing mechanism comprising a reciprocating bar mounted on the front end of the spout support, means to actuate the finishing mechanism as the spout is being moved back from over the mold, a driving shaft for said machine, a driving clutch on said driving shaft, a manually operable control lever adapted to engage the clutch and shaft, and means operable by said mold to disengage said clutch and mold.

16. In a block machine, the combination of a block mold provided with movable cores, tamping mechanism, means to supply block material to the mold, means to finish the molded block, a main shaft and means to drive the same, a cam on the main shaft and means connected therewith to move the cores into the mold, a second cam on the main shaft and means connected therewith to control the tamping mechanism, a third cam and means connected therewith to control the supply of block material, a fourth cam on the main shaft and means connected therewith to move the finishing device across the molded block, and a fifth cam on the main shaft and means connected therewith to open the mold to discharge the finished block.

17. In a block machine, the combination of a block mold provided with movable cores, tamping mechanism, means to supply block material to the mold, means to finish the molded block, a main shaft and means to drive the same, a cam on the main shaft and means connected therewith to move the cores into the mold, a second cam on the main shaft and means connected therewith to control the tamping mechanism, a third cam and means connected therewith to control the supply of block material, a fourth cam on the main shaft and means connected therewith to move the finishing device across the molded block, a fifth cam on the main shaft and means connected therewith to open the mold to discharge the finished block, a main control lever to cause the main shaft to rotate, and means operated by the mold when opened to stop the main shaft.

CLAUS O. BRANDELL.